United States Patent Office 2,844,410
Patented July 22, 1958

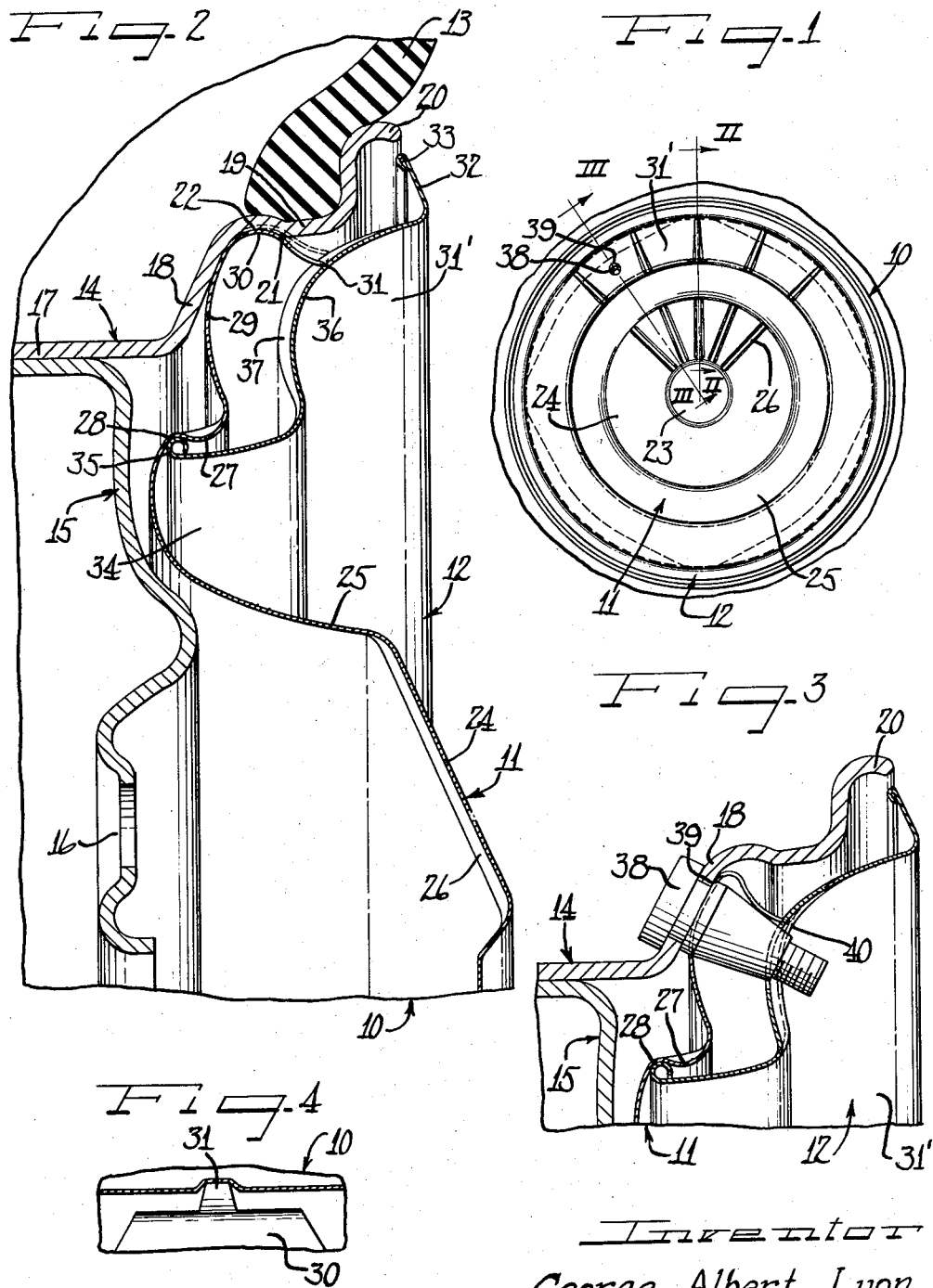

2,844,410
WHEEL COVER
George Albert Lyon, Detroit, Mich.
Application September 30, 1955, Serial No. 537,703
13 Claims. (Cl. 301—37)

This invention relates generally to a wheel cover construction and more particularly to multi-part cover having novel means for retaining the cover parts in assembled relation upon the wheel.

As is well known, there is a never ending search by wheel cover manufacturers for new cover constructions possessing highly outstanding ornamental qualities. As a consequence, when such cover is developed there is often presented an entirely new problem for adequately maintaining the cover upon the wheel. One important aspect of providing suitable retaining means is to provide means for holding the cover on the wheel in such a manner as to insure co-rotation of the cover and wheel. As is well known if the cover does not co-rotate with the wheel there is a greater likelihood for the cover to become dislodged and additionally, a greater likelihood that the valve stem will be sheared off.

Accordingly, an object of this invention is to provide a novel multi-part cover construction possessing highly ornamental qualities.

Another object of this invention is to provide a novel multi-part cover construction having means capable of insuring relative co-rotation of the inner and outer cover members.

Yet another object of this invention is to provide a novel multi-part cover construction which lends itself to economical manufacture on a large production scale.

According to the general features of this invention there is provided in a wheel structure, a wheel having a flanged drop center type tire rim including joined radial and axial flanges in the latter of which is an annular shoulder defining a tire bead safety groove on the inside of the rim, an inner cover member having retaining means capable of snap-on retaining engagement in the safety groove behind the shoulder with the retaining means having an extension extending generally axially outwardly, and an outer cover member having a portion capable of snap-on retaining engagement with said inner cover member and having spaced recesses in axial alignment in engagement with said extensions to insure co-rotation of the inner and outer cover members.

Another feature of this invention relates to the particularly constructed tab for engagement in the recess above mentioned.

Still another feature of this invention relates to the provision of a cover assembly including inner and outer cover members with the inner cover member having means for detachably maintaining the assembly on the vehicle wheel and with the same means cooperating with the outer cover member to cushion and back-up the same.

Other objects and features of this invention will more fully appear from the following detailed description taken in conjunction with the accompanying drawing which illustrates a single embodiment thereof and in which:

Figure 1 is a fragmentary side view of a wheel equipped with my novel cover;

Figure 2 is an enlarged fragmentary cross sectional view taken substantially on the line II—II of Figure 1 looking in the direction indicated by the arrow;

Figure 3 is an enlarged fragmentary cross sectional view taken substantially on the line III—III of Figure 1 looking in the direction indicated by the arrow; and Figure 4 is a fragmentary enlarged detailed view showing the engagement of the end of the retaining portion in the recess.

As shown on the drawings:

My novel wheel cover 10 including inner and outer cover members 11 and 12 is cooperable with a conventional type of automobile wheel which includes the usual tire 13 of either the tube or tubeless type carried in the customary way upon a multi-flanged drop center type of tire rim 14. This rim 14 is in turn supported in the usual way upon a central dished metallic body part 15 having a central bolt-on flange 16 by means of which the wheel can be attached by bolts or cap screws (not shown) to a part on an axle of a wheel.

The tire rim 14 includes an attachment flange 17 which is secured to the body part 15. Stepped outwardly from the rim flange 17 are successive connected flanges including a generally radially outwardly extending flange 18, a generally axially outwardly extending flange 19, and terminating in a curled generally radially and axially extending flange 20. Located on the radially inner side of axial flange 19 is an annular shoulder 21 defining a tire bead safety groove 22.

Cooperable with the wheel is the inner cover member 11 having a relatively small drop center crown 23 connected to an intermediate generally radially outwardly and axially inwardly extending portion 24 terminating in a dished generally radially outwardly and axially inwardly extending terminal 25.

As is best seen in Figures 1 and 2, it will be noted that portion 24 has located thereon a plurality of circumferentially spaced ornamental ribs 26.

Pressed out of the dished cover portion 25 and positioned at circumferentially spaced intervals facing generally radially inwardly is a plurality of outer cover member retaining shoulders 27. It will be noted that positioned axially inwardly of the shoulder 27 is an annular groove or seat 28 which is adapted to receive therein a portion of the outer cover member 12 later to be described herein.

Secured to the outer margin of the cover member 11 is a relatively stiff radial continuous annular flanged portion 29 which is flared radially outwardly to a greater extent at circumferentially spaced intervals which radially outwardly flared areas are bottomed against the rim flange 18 behind the groove. Connected to the relatively stiff portion 29 at each of the areas where the flange portion 29 is flared radially is a generally radially inwardly axially outwardly extending relatively resilient terminal portion 30 which comprises a relatively small arcuate segment in comparison to the portion 29. As is illustrated in Figure 1, four wheel engaging terminal portions 30 are shown with each of them connected to the annular stiff portion 29 which is bottomed against the wheel. Connected to the tip of the terminal 30 where the portion 29 is flared at circumferentially spaced intervals is a tab 31 which serves a purpose which is later herein discussed.

The outer cover member 12 is adapted to overlie the tire rim and to conceal the engagement of the cover member retaining means with the wheel. The outer cover member 12 includes a central dished or concave portion 31' having a turned outer terminal 32 terminating in a curled pry-off bead 33. The radially inner end of the dished portion 31' terminates in a turned generally axially inwardly extending portion 34 which has at its axially inner margin an annular bead 35 which is adapted to snap-over spaced shoulders or bumps 27 in tensioned engagement in groove or seat 28. This action is brought about since the diameter of the cover portion 34 is normally slightly larger than the inner diameter of groove or seat 28. Accordingly, the bead 35 is tensioned as it is stressed over bumps 27 into detachable retaining engagement in seat 28.

Positioned at circumferentially spaced intervals upon intermediate portion 31' are a plurality of generally curved ribs 36 each of which has a recess 37 opening on the axially inner side of the cover member 12.

As in shown in Figure 3 it will be noted that extending through radial flange 18 is a valve stem 38. When the inner cover member is assembled on the wheel, aperture 39 on inner cover member portion 29 is axially aligned with the tip of the valve stem and thereafter the cover is urged axially inwardly with each of the portions 30 being progressively resiliently stressed and eventually snapped behind rim shoulder 21 into groove 22. The radial or terminal portion disposed at the radially outer end of the portion 29 appears slightly distorted because the terminal portion is circumferentially spaced from the area where the section was taken.

The outer cover member 12 is then centered with respect to the tire rim and aperture 40 in dished portion 31' is axially aligned with the end of the valve stem 38 and the cover is then urged axially inwardly with the result that the bead 35 is progressively cammed over shoulder 27 until it snaps therebehind into retaining engagement in groove 28.

In the assembly of the outer cover member 12 with relation to inner cover member 11 it will be appreciated that by centering valve stem 38 with aperture 40, recesses 37 defined by pressed out ribs 36 are at the same time aligned with tabs 31. When the outer cover member 12 is assembled upon the wheel, it will be appreciated that the engagement between tab 31 and rib recess 37 serves to interlock the two cover members and in that manner insure relative corotation of same. Another feature to be noted is that the tab is so configurated as to conform generally to the cross sectional configuration of the rib at the point of engagement.

In view of the foregoing it will be seen that I have provided means for interlocking inner and outer cover members together thereby insuring co-rotation of the cover members while at the same time providing a resilient back-up for the outer cover member to stabilize same in assembly on the wheel. The resilient back-up relationship is brought about by virtue of the portion 29 and more particularly the tab 31 being resiliently deflectable in response to impact forces applied against the outer cover member 12.

While it is true that the valve stem in itself may be used to coordinate the inner and outer cover members with the wheel to insure co-rotation, as a result of employing tabs 31 this metal to metal contact between the cover members positively insures co-rotation of same without any possibility of the valve stem being sheared off.

It will be understood that modifications and variations may be effected without departing from the scope of the novel concepts of the present invention.

I claim as my invention:

1. In a wheel structure, a wheel having a flanged drop center type tire rim including joined radial and axial flanges in the latter of which is an annular shoulder defining a tire bead safety groove on the inside of the rim, an inner cover member having retaining means capable of snap-on retaining engagement in the safety groove behind the shoulder with the retaining means having an extension extending generally axially outwardly, and an outer cover member having a portion capable of snap-on retaining engagement with said inner cover member and having spaced recesses in axial alignment and engagement with said extensions to insure co-rotation of the inner and outer cover members.

2. In a wheel structure, a wheel having a flanged drop center type tire rim including joined radial and axial flanges in the latter of which is an annular shoulder defining a tire bead safety groove on the inside of the rim, an inner cover member having retaining means capable of snap-on retaining engagement in the safety groove behind the shoulder with the retaining means having an extension extending generally axially outwardly, an outer cover member having a portion capable of snap-on retaining engagement with said inner cover member and having spaced recesses in axial alignment and engagement with said extensions to insure co-rotation of the inner and outer cover members, and means interposed between the wheel and at least one of the cover members to insure co-rotation of the cover members when the latter are mounted upon a wheel.

3. In a wheel structure including rim and body parts having a generally axial flange provided with a retaining shoulder, a cover construction including inner and outer cover members with the inner cover member having circumferentially spaced retaining portions extending therefrom into snap-on, pry-off relation behind said retaining shoulder and terminating in a generally axial terminal, an outer cover member for overlying disposition of the junction of the inner cover member and wheel and being carried by said inner cover member having generally radially extending circumferentially spaced ribs defining pockets opening on their axially inner sides for receiving one of said terminals therein to insure relative co-rotation of the cover members.

4. In a wheel structure including rim and body parts having a generally axial flange provided with a retaining shoulder, a cover construction including inner and outer cover members with the inner cover member having circumferentially spaced retaining portions extending therefrom into snap-on, pry-off relation behind said retaining shoulder and terminating in a generally axial terminal, an outer cover member for overlying disposition of the junction of the inner cover member and wheel and being carried by said inner cover member having generally radially extending circumferentially spaced ribs defining pockets opening on their axially inner sides for receiving one of said terminals therein to insure relative co-rotation of the cover member, said terminals each corresponding generally to the cross-section of the corresponding rib in bottomed engagement therein thereby cushioning and stabilizing the outer cover member relative to the wheel.

5. In a wheel structure including rim and body parts with one of the parts provided with an axial flange, a cover including inner and outer cover members with the inner cover member in cover retained assembly with said axial flange and having at least one generally axially outwardly extending portion, and an outer cover member carried thereon for overlying disposition of the junction of the inner cover member and axial flange to conceal same having at least one axially rearwardly opening pocket defining a recess, said pocket and portion interlocked together to insure co-movement of the cover members while at the same time providing back-up for the outer cover member.

6. The wheel structure of claim 5 further characterized by said pocket and recess being elongated radially and with said portion having a reduced tip engaged in yieldable relation in said recess.

7. The wheel structure of claim 5 further characterized by a valve stem extending outwardly from the rim part through openings in the cover members to align said portion with said recess.

8. In a wheel structure including a tire rim and a body part with the tire rim provided with an axial flange and having an outer rim margin, a cover including an inner cover member and an outer ring member with the inner cover member disposed radially inwardly of the axial flange and with the outer cover member extending radially outwardly generally over the outer margin of the tire rim, said inner cover member having at least one generally axially outwardly extending resiliently deflectable portion for maintaining the cover assembly in detachable engagement on the wheel, and said outer ring member carried thereon for overlying disposition of the junction of the inner cover member and axial flange to conceal same having an axially rearwardly facing radially outwardly extending surface, said resiliently deflectable portion having a yieldable tip engaged against said surface to provide a cushioning stabilizing back-up for the outer ring member.

9. In a wheel structure including rim and body parts having a generally axial flange provided with a retaining shoulder, a cover construction including inner and outer cover members with the inner cover member having circumferentially spaced retaining portions extending therefrom into snap-on, pry-off relation behind said retaining shoulder and terminating in generally axial terminals, an outer cover member for overlying disposition of the junction of the inner cover member and wheel and being carried by said inner cover member having generally radially extending circumferentially spaced ribs defining pockets opening on their axially inner sides for receiving one of said terminals therein to insure relative co-rotation of the cover members, said retaining portions extending radially outwardly from an outer margin of said inner cover member into said axial terminal with said terminal engaged with said shoulder and extending generally axially outwardly therefrom into engagement with the outer cover member.

10. In a wheel structure including rim and body parts with one of the parts provided with an axial flange, a cover including inner and outer cover members with the inner cover member in cover retained assembly with said axial flange and having at least one generally axially outwardly extending portion, and an outer cover member carried thereon for overlying disposition of the junction of the inner cover member and axial flange to conceal same having at least one axially rearwardly opening pocket defining a recess, said pocket and portion interlocked together to insure co-movement of the cover members while at the same time providing a back-up for the outer cover member, said at least one generally axially outwardly extending portion comprising a plurality of circumferentially spaced axial portions, said inner cover member having projecting radially outwardly of its outer margin, a continuous annular radial flange portion and with the radial flange portion flared radially outwardly at circumferentially spaced intervals against the axial flange and said plurality of axially outwardly extending portions being connected to said radial flange portion at the radially outwardly flared areas.

11. The wheel structure of claim 10 further characterized by said axial portion comprising a portion of the rim part and having an annular groove and with the radially outwardly flared areas bottomed against the rim part behind the groove and with the axial portions retainingly engaged in the groove.

12. The wheel structure of claim 5 further characterized by the outer cover member having an annular recessed cover portion in which said at least one pocket is disposed and with the recessed portion being disposed axially outwardly of and in confronting relation to said axially outwardly extending portion.

13. The wheel structure of claim 5 further characterized by means being disposed between the cover members generally at the outer margin of the inner cover member and at the inner margin of the outer cover member retaining the cover members in detachable assembly, and said axially outwardly extending portion having a tab-like projection engaged within the recess on the outer cover member to insure co-rotation and to back-up the outer cover member at an area spaced from its inner margin.

References Cited in the file of this patent
UNITED STATES PATENTS

| | | |
|---|---|---|
| 2,407,669 | Lyon | Sept. 17, 1946 |
| 2,600,411 | Lyon | June 17, 1952 |
| 2,609,245 | Lyon | Sept. 2, 1952 |